United States Patent [19]

Faber

[11] Patent Number: 4,935,816

[45] Date of Patent: Jun. 19, 1990

[54] METHOD AND APPARATUS FOR VIDEO IMAGE FILM SIMULATION

[75] Inventor: Robert A. Faber, 14054 Badger Ave., Sylmar, Calif. 91342

[73] Assignee: Robert A. Faber, Sylmar, Calif.

[21] Appl. No.: 370,454

[22] Filed: Jun. 23, 1989

[51] Int. Cl.$^5$ ............................................. H04N 5/14
[52] U.S. Cl. ...................................... 358/160; 358/140
[58] Field of Search ...................... 358/160, 140, 21 R, 358/141, 213.22, 166

[56] References Cited

U.S. PATENT DOCUMENTS

| | | | |
|---|---|---|---|
| 4,698,673 | 10/1987 | Johnson | 358/140 |
| 4,730,217 | 3/1988 | Tonge | 358/160 |
| 4,740,842 | 4/1988 | Annegarn | 358/140 |

Primary Examiner—James J. Groody
Assistant Examiner—Amir Zarabian
Attorney, Agent, or Firm—Christie, Parker & Hale

[57] ABSTRACT

Video signals from pre-recorded video tape or a video camera are received by the present invention and processed to provide the appearance of a motion picture film recorded image. The output of the invention may be provided directly for television broadcast or recording on video tape. Simulation of film frames is provided by summing a real time signal and delayed signals to create an interpolation of preceding and succeeding video fields. Addition of mixed, clipped and filtered noise to provide the appearance of grain in photographic film and alteration of the apparent contrast provide variable artistic attributes which are adjustable for the desired film appearance.

12 Claims, 4 Drawing Sheets

METHOD AND APPARATUS FOR VIDEO IMAGE FILM SIMULATION

FIELD OF THE INVENTION

The present invention relates generally to the field of transfer of video images onto recorded media. More specifically, the invention provides a method and apparatus for receiving a video signal from a prerecorded video tape or a video camera and processing the image to provide the appearance of a motion picture film recorded image to be output directly for television broadcast or recording on video tape.

Prior Art

Two basic approaches exist for recording of moving picture images. The first and older process employs photographic film exposed using a motion picture camera which is developed and printed to projection film which may then be shown using a projector and screen. Film frame rates for use in cameras and projectors have been standardized at 24 frames per second which provides the appearance of near continuous motion to the human eye. Thirty frames per second is occasionally employed for films for television. The photographic film and various processing requirements to produce the end product are expensive and require skilled technicians and appropriate facilities for production.

Despite the cost, however, certain attributes of the film process provide an appearance which is aesthetically pleasing and, to some extent, may influence the artistic quality of the recorded images.

The chemical composition of the film and development processes creates the "grain" of the film which alters the appearance. Further, contrast of the images on the film varies non-linearly as a function of light level or exposure. The combination of grain and contrast may be varied by processing techniques and original photographic film composition to provide the desired "look".

The second major process for recording motion pictures is video taping where images are recorded directly on magnetic tape from a television or video camera. Video recording has been designed to conform to standard television formats. In the United States the basic television broadcast format comprise 525 lines of information of which approximately 480 lines are displayed on a television screen. Scanning of the entire 525 lines is accomplished 30 times a second. Since television signal transmission is accomplished at 60 fields per second, each television frame of 525 lines is broken into two separate fields of 262 lines and 263 lines. These "even" and "odd" fields are transmitted alternately at 60 hertz. The lines of the even and odd fields are alternately interleaved to provide the full 525 line frame once every 1/30 second (thirtieth of a second) in a process known as interlacing. Many other standards in the world use 625 lines of information and interlace 312 and 313 lines at 50 fields per second.

Unlike photographic motion picture film, video recording of images does not contain any grain and for the most part gray scale of the signal of the video camera as recorded on video tape is essentially linear. Noise or "snow" in a video system is typically undesirable and extensive electronic filtering is employed to eliminate noise from electronic circuits in cameras, recorders and television sets for a clear picture. The flexibility present with photographic film in varying the artistic appearance of the final product by film and process selection is, for the most part, not present with video recording. However, the relative cost of video tape recording is significantly less than photographic film recording. The cost of the photographic film itself, and developing and processing significantly exceeds the cost of video tape. On long running times this cost can be dominant. In addition, editing, which may be done by re-recording with video tape, is considerably more complex with standard movie film processes.

The less artistic appearance of video recorded images often results in a decision by producers or directors to use photographic film as opposed to video taping in spite of the above-mentioned advantages. Techniques to enhance the appearance of images recorded on video tape are therefore desirable to provide a combination of the economics of video taping with the desirable appearance of photographic film processes.

Some prior art systems exist which employ a combination of video and film technologies. A system known as "kinescope recording" was developed early after the advent of television broadcasting to record a program for later rerun which was broadcast live using television cameras. The kinescope system basically recorded the pictures on a television screen using a photographic movie camera and was rebroadcast by projecting the developed film before a television broadcast camera. To some extent the kinescope system does add the film attributes when rebroadcast. However, the cost of the photographic film and processing is not eliminated and the basic system concept inherently provided poor quality of image transfer (poor contrast, lack of detail, and geometric distortions).

The second industry standard system known as the "telecine" system employs a scanning system to transfer images already recorded on photographic film to video tape. In the telecine system one frame of film is scanned onto two video fields (an even field and an odd field) with the subsequent frame of film scanned onto three video fields. The "two-three" sequence is repeated to distribute 24 film frames onto 60 fields of video. Two fields of video are generated for every frame of film if film is shot at 30 frames per second for American television (60 fields per second) or for 24 frames per second film transferred to a 50 field per second standard (typically overseas). This overcomes the basic timing incompatibility of standard photographic movie film and television/video tape. The kinescope lacked this capability. The telecine system does capture the desired film characteristics on the final video tape. However, the initial cost of photographic film and its associated processing is still required.

A third prior art example allows the use of video cameras and video tape for the initial recording of the moving picture images. The recorded video is then broken down into red, green and blue (RGB) components and scanned onto photographic film. The photographic film is then processed and returned to video tape using the telecine process. The elimination of the need for photographic film cameras provides some savings in this process. However, the cost of scanning equipment for the transfer from video to photographic film is added. The basic cost of the photographic film and its associated processing is also still present.

SUMMARY OF THE INVENTION

The present invention provides a method and apparatus in which video image signals are modified to produce the aesthetically desirable appearance of film but with the economy of video technology. A composite video signal is input from a video camera or a prerecorded video tape. The signal is split to provide a first real time signal for picture information, a second real time signal for synchronization and color burst information, a first delayed signal and a second delayed signal. The length of the first and second delays correspond to the length of time from any given line to the upper adjacent line of the previous field and to the lower adjacent line of the previous field in the video signal respectively.

Clipped filtered white noise is summed with the picture portion of the first real time signal to simulate the "grain" of film. The first real time signal is then summed with the first delayed signal to form a first interpolated field and with the second delayed signal to provide a second interpolated field. The second interpolated field is routed through a third delay equal in length to the first delay. The first interpolated field and the second interpolated field which has been delayed are alternately selectable by a first switch. The signal from the first switch is routed directly to a second switch and indirectly to the second switch through a fourth delay having a duration equal to the sum of the first and second delay. The direct or indirect signal selected by the second switch is connected to the input of a nonlinear amplifier. A third switch selects between the output of the nonlinear amplifier and the second real time input signal. The output of the third switch is provided through a buffer as the processed video output.

A control means is connected to the composite video input signal and responsive to the start of a field and the synchronization signals of the composite video. The control means provides a first control signal to the first switch to select the first and second interpolated fields alternately twice followed by consecutive selection of the first interpolated field for simluation of 24 frames per second. This sequence is then repeated. The control means provides a second control signal to the second switch whereby the input from the fourth delay to the second switch is selected coincident to the concurrent selection of the first interpolated field in the first switch. A third control signal is provided from the control means to the third switch for selecting the second real time signal provided through a fifth delay during the synchronization portion of each line signal.

The resultant processed video output comprises five field sets (for 24 frames per second simulation) wherein each of the first four fields is an interpolation of a preceding and succeeding frame pair while the fifth field is a repeat of the third interpolated field. This sequencing of fields results in timing which simulates the 24 frames per second of film. When the fifth field is not a repeat of the third field, 30 frames per second is simulated (or 25 frames per second in the case of a 50 field per second scanning system—overseas standard). The nonlinear amplifier alters the appearance of the output by changing the apparent contrast while the mixed clipped and filtered noise provides the appearance of grain similar to photographic film. The grain is identical in matched successive fields due to the alternating interpolations in the system, thereby giving the appearance of consistent grain in each simulated film frame which is characteristic of photographic film.

DETAILED DESCRIPTION

Figure 1:
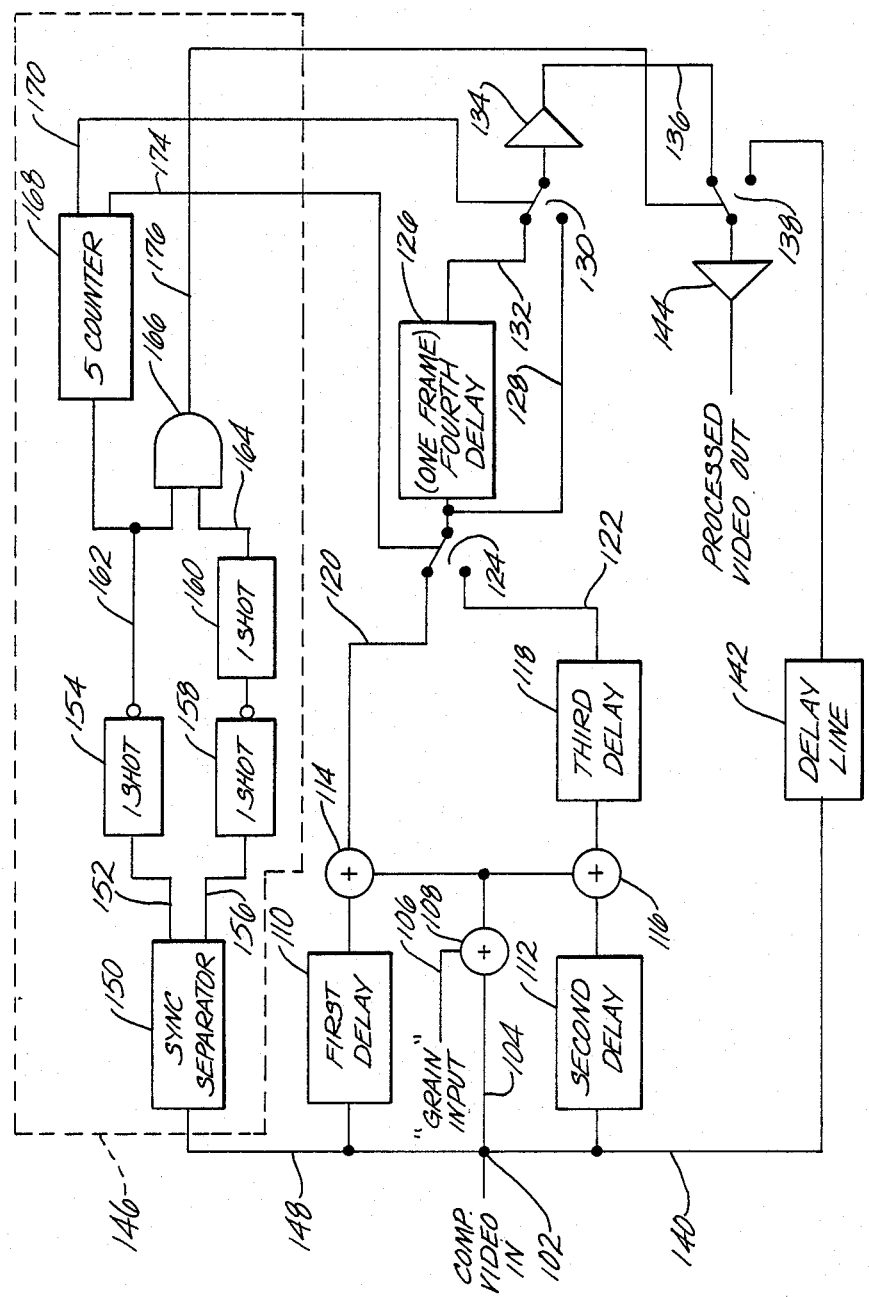
FIG. 1 is a schematic block diagram of a first embodiment of the present invention.

Referring now to the drawings, FIG. 1 shows a block diagram of the basic elements of the invention.

Figure 2:
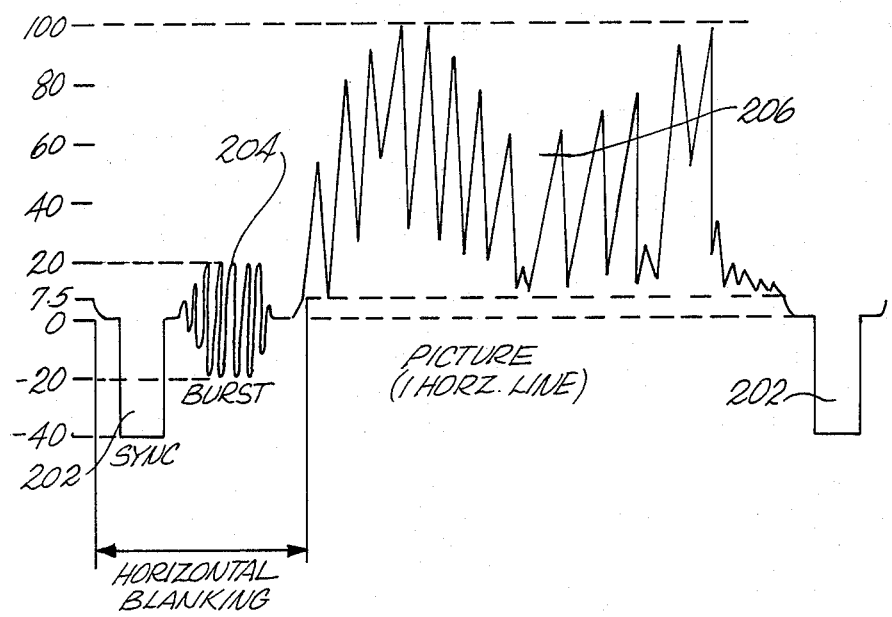
FIG. 2 is a representation of the composite video signal received by the invention.

The input 102 to the invention is a basic composite video signal which may be received directly from a video camera or from a playback of a video tape which was prerecorded. A schematic representation of the composite video signal is shown in FIG. 2. Each line of video is represented by a first horizontal synchronization pulse 202. This pulse extends to $-40$ IRE (Institute of Radio Engineers Units) to achieve synchronization during horizontal retrace. The "sync" pulse is followed by a color burst 204 which is 40 IRE, peak to peak, centered about 0 IRE and is a reference interpreted by the color circuits of the receiving television for demodulation of the chrominance component of the picture signal. The actual picture signal 206 follows the color burst and is typically between $+7.5$ IRE and $+100$ IRE. The picture signal is a combination of the luminance signal and chrominance signal. The luminance signal provides the basic light and dark variations of the televised picture while the chrominance signal provides the color intelligence for the completed color picture. The same basic picture format is repeated for each line of the picture. Vertical retrace is accompanied during vertical blanking as known to those skilled in the art.

During vertical blanking, typically in the U.S. standard, lines 1 through 21 of each field do not contain visual information. Lines 1 through 9 are normally allocated for vertical synchronization while lines 10 through 21 are reserved for the remainder of vertical blanking and vertical internal test signals (VITS), vertical internal reference signals (VIRS), and other data such as closed captioning for the hearing impaired.

The composite video signal is carried into four circuit paths in the invention, as shown in FIG. 1. The first path 104 carries the composite video signal real time. A desired feature of the invention is to provide a simulation of the grain present in photographic film processes. As will be described in greater detail subsequently, a "grain" signal is provided on input 106 and added to the real time composite video signal in summer 108.

The composite video signal is also provided to a first delay means 110 and a second delay means 112. The first delay is equal to the number of lines difference from any given line of the real-time video to the lower adjacent line of the previous field. This is equal to the total number of scanning lines in a complete video frame divided by two, minus one half (e.g., for a 525 line scanning system this is $525/2 - 1/2 = 262$; for a 625 line scanning system this is $625/2 - 1/2 = 312$). The second delay is equal to the number of lines difference from any given line of the real-time video to the upper adjacent line of the previous field. This is equal to the total number of scanning lines in a complete video frame, divided by two, plus one half or simply one greater than the first delay. The first delay is also equal to the duration of an even field. The second delay is also equal to the duration of an odd field. Standard READ/WRITE video digital memory may be employed for both delay devices. The real time video signal with grain is combined with the first delayed signal through summer 114 and is combined with the second delayed signal in summer 116.

The summing of the real time signal with the first delayed signal creates a video field which is an interpolation of the real time field and the lower adjacent lines of the prior field. This combined field will be referred to as the "A" field. The summing of the real time signal with the second delayed signal provides a second video field which is an interpolation of the real time field and the upper adjacent lines of the prior field to provide an interpolated field which will be referred to as the "B" field.

The "A" field is an interpolation between any given line of the real time video and its previously interlaced, lower adjacent video line in the prior field. The "B" field is the interpolation of the same real time line and its previously interlaced but upper adjacent line from the prior field. The "A" and "B" fields therefore contain the different vertical information normally present between adjacent fields, yet the sequential display of the two fields show no change in movement because they are interpolations of the same adjacent fields. Thus, vertical resolution is essentially intact but image motion does not occur between the "A" and "B" fields when they are sequenced. Image motion would not occur between adjacent fields made from the same actual film frame.

Sequencing of the "A" and "B" fields is accomplished by running the interpolated signal of the "B" field from summer 116 through a third delay 118 which is equivalent to the first delay. In the embodiment shown in FIG. 1 this third delay is accomplished using a 262-line READ/WRITE video digital memory equivalent to delay 110. Alternately switching between the "A" field output 120 from summer 114 and the "B" field output 122 from the third delay means using switch 124 sequences the internal video signal. The method for controlling switch 124 will be discussed in greater detail subsequently.

The internal video signal transmitted through the first switch 124 is provided to a fourth delay means 126 and to a real time path 128. A second switch 130 controllably selects between the real time path and the output 132 of the fourth delay means to provide the internal video signal to a non-linear amplifier 134. The amplifier adjusts the internal video signal from the normally linear gray scale indicative of video to a nonlinear gray scale imitating the characteristics of the exposure versus density curve in photographic film. In the present embodiment, the contrast or gamma is reduced at levels below approximately 30 IRE and increases above normal levels over approximately 40 IRE. In the preferred embodiment, the non-linear amplifier is adjustable to achieve the best imitation of the characteristics desired in the particular film simulation process.

Figure 3:
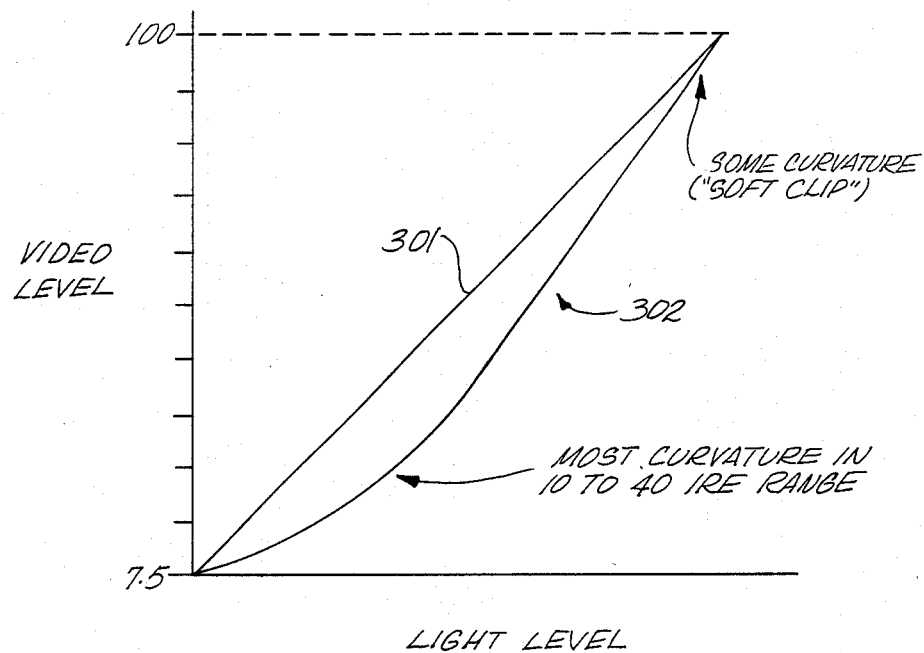
FIG. 3 is a schematic representation of the contrast function for film and video recording.

The differences in the gray scale or transfer characteristics are demonstrated in FIG. 3. A normal video gray scale is shown by curve 301 which provides linearly increasing video level with respect to light level or exposure while curve 302 demonstrates a nonlinearly increasing video level with light level characteristic of photographic film image recording.

The output 136 of the non-linear amplifier is provided to a third switch 138. A second real time composite video signal is provided to the circuit on path 140 to a delay line 142. The delay line provides a sufficient delay in the second real time signal to compensate for the propagation delays present in the circuit paths of the first real time signal, as will be described in greater detail subsequently. The second real time signal provides original sync and burst signals. Switch 138 selectively provides the signal output from the non-linear amplifier or the second real time signal to an output buffer 144 which transmits the processed video output.

Control of the switches in the circuit is provided by a controller 146. The controller receives the composite video on input 148. The synchronization and color burst portions of the signal previously described are decoded by a sync separator 150. The sync separator provides a first signal output 152 responsive to the start of a field which initiates a first timer 154. A second control signal output 156 responsive to the composite sync and the color burst initiates a second timer 158. A third timer 160 is initiated upon expiration of the second timer. The outputs of the first and third timers 162 and 164, respectively, are provided to a first logic gate 166. The first timer forces the logic gate into a not-true condition during the time period of lines 1 through 21, representing vertical blanking and other non-picture information following the start of the field as previously described. The third timer allows the logic gate to maintain a true condition during the picture portion of the signal.

In the embodiment shown, timing is accomplished through the use of one-shot logic circuits for the timers and an AND gate for the first logic gate. The first one-shot provides a low output for the period of the first 21 lines of the field after initiation by the start of field. The second one-shot is initiated by the sync portion of the video line and issues a low signal for approximately 9.2 microseconds approximating the period of time from sync to unblanking (picture). The rising edge of the signal upon the expiration of the second one-shot, triggers the third one-shot to provide a high output for approximately 52.7 microseconds which approximates the period of the picture portion of each line of video. Consequently, the output of the AND gate is high during the picture portion of the signal except during lines 1 through 21. In the preferred embodiment, the first logic gate is designated the "luminance" gate since a true signal is provided only during the portion of the video signal wherein the luminance signal is present.

Figure 4:
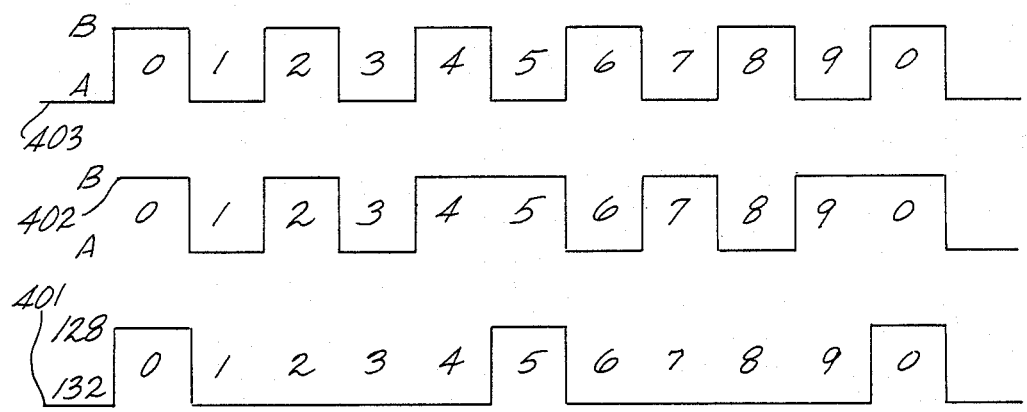
FIG. 4 is a representation of the control signals present in the first embodiment of the invention.

The output of the first timer is also provided to a counter 168. A first output 170 providing a signal once every five counts (fields), as demonstrated in FIG. 4 signal 401, is connected as a control signal to the second switch 130 which connects the output of the fourth delay to the non-linear amplifier every fifth field. A second output 174 of the counter provides an alternating signal level for four counts with a sustained signal level on count 5, as demonstrated in the signal labeled 402 of FIG. 4. Output 174 is connected to provide control of the first switch, thereby alternately selecting field A on output 120 and field B on output 122 for three counts followed by consecutive selection of field B for two counts. The repeated sequence of selected fields from the first switch is therefor A-B-A-B-B-A-B-A-B-

B. The repeated sequence of selected fields from the second switch is then A-B-A-B-A'-A-B-A-B-A'. A' is A delayed one frame.

The output 176 of the luminance gate controls the third switch to provide the output of the non-linear amplifier as the processed video output during picture portions of each line signal while providing the real time composite video signal fed through the delay line as the processed video output (sync and burst only) during non-picture portions of each line signal.

The simulation of film "grain" in the processed video output is accomplished through the use of clipped white noise. The "grain" in film recorded imagery tends to appear as random dark spots on each frame of film. By clipping the positive swing of random white noise, random amplitude negative going spikes are created. When these spikes are summed into the real time video signal as the "grain" signal, the summed signal provides an appearance of random dark spots in the picture portion of each line. Since the real time signal is alternately summed with the first delayed signal and second delayed signal as previously described, the "grain" added by the clipped noise is consistent for two fields or one simulated film frame. Since the fifth field is a repeat of the third field in each stream of video data (for 24 frames per second simulation), the grain is consistent in three fields of the third field in the "two-three" format. The appearance, therefore, simulates the grain on individual film frames. The processed noise summed into the system in the "grain" input is approximately one percent (or less) of the signal level of the composite video signal. Since the negative going spikes in the noise are clipped, and they do not change every field, "snow", which is typical of noise introduction in video signals, is not created.

In television standards where chrominance subcarrier phase inverts (180 degrees) each scanning line, additional steps must be taken in the invention to provide proper chrominance phase. The chrominance signal inverts in each consecutive line. Since the B field employs an odd number of lines delay and the fifth delay involves an odd number of lines delay, the chrominance signals for those fields must be inverted for proper decoding of the color intelligence relative to the sync and color burst signals which are inserted in the processed video signal output at switch 138 as previously described. This process of retrieving the real time signal during the sync and color burst portions of each line for the processed video output preserves original sync, burst, and odd/even vertical interval precise phase and levels which would be potentially distorted in the processing of the picture signal. The inversion or 180° phase shift of the chrominance signals may be accomplished by circuitry in the read/write digital video memory components for the odd number of lines delay circuits.

Figure 5:
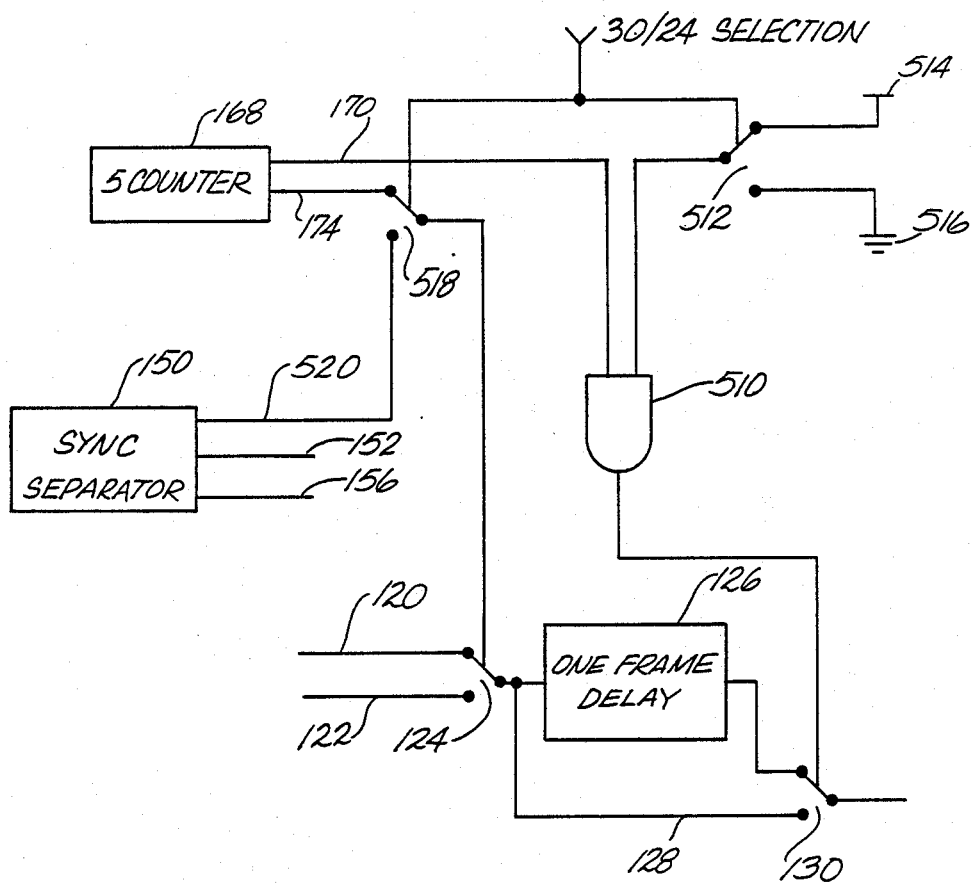
FIG. 5 is a schematic block diagram of an embodiment of the present invention employing selectable 24 frame per second or 30 frame per second simulation.

A 30 film frame per second mode is selectable in the invention by by-passing counter 168 of FIG. 5 and providing continuously alternating selection of the A field and B field in a "two—two" format. Addition of a second logic gate 510 between the counter and second switch 130 to receive the one in five signal from the counter and a fourth switch 512 selectably providing a high signal from a voltage source 514 or a low signal by connection to ground 516 provides selectable control of the second switch 130. With the fourth switch in the high position, fifth count transitions from the counter are transmitted through gate 51 to the second switch, thereby connecting the one frame delay to the non-linear amplifier. With the fourth switch in the grounded position, logic gate 510 provides a low signal to the second switch maintaining the second switch in connection with real time path 128. A fifth switch 518 is added between the counter second output 174 and the first switch 124 to selectably connect the counter output which is a continuously alternating control signal 520 to control the first switch. With a continuously alternating control signal, fields A and B are alternately selected with no consecutive selection of field B on the fifth count as previously described. Switches 512 and 518 are operated together. For television standards with field rates of 50 fields per second, the 30 frame mode is always used and the fourth delay is never employed. Interpolated pairs of fields are alternating them thus yields a 25 film frame per second simulation.

The interpolated fields A and B with vertical resolution maintained and simulated grain added are provided through the non-linear amplifier to the buffer as processed video output. The alternating control signal may be supplied from the sync separator in response to the standard odd and even field signals present in the composite video input or an alternate suitable signal.

Operation of the system as shown in FIGS. 1 and 5 begins with receiving the composite video signal input. For 60 field rate standards, the apparatus of the invention is configured to select either 24 frames per second simulation or 30 frames per second processing using switches 512 and 518. For 50 field rate standards (such as used overseas), the apparatus of the invention is configured for 25 frames per second. In this configuration, switches 518 and 512 are permanently set to alternate signals 120 and 122 only without the use of the one-frame delay. The composite video signal is provided to a first video memory for a delay equal to one even field length and simultaneously fed to a second video memory for a time delay equivalent to one odd video field. The real time signal is then individually summed with the output of the even field delay memory and the odd field delay memory. The summed signal from the odd field delay memory is then routed through a third video memory providing the same delay as the first even field memory. The summed even field delay signal and the output of the third video memory are then alternately selected to provide an A field and a B field respectively (new odd and even fields). The selected field signal is provided to a fourth video memory having a delay equivalent to one frame. The alternating A and B fields are processed through a non-linear amplifier to alter the apparent gray scale of the signal. On every fifth field (24 frame film on American 60 field standard) the signal output from the fourth video memory is connected to the non-linear amplifier adding a repeat of the second prior A field designated A'. The sequence of fields output from the non-linear amplifier conforms to an ABABA' format. The processed video output is provided by selecting the signal from the non-linear amplifier during picture portions of each video line and selecting the composite video signal input, which has been routed through a delay line to compensate for circuit delay in the processed signal, during the sync and color burst portions of the signal. Chrominance inversion is accomplished on the processed signal provided by the odd number of lines delay (second delay) video memory and the one frame (fourth delay) video memory for proper color framing.

If a 30 frame per second processing or a 25 film frame per second processing to a 50 field foreign standard has been selected, the one frame delay memory is ignored and consecutively alternating A and B fields are provided through the non-linear amplifier for combination with the delayed sync and color burst portions of the composite video signal to provide the processed video output.

Having now described the invention in detail as required by the patent statutes, those skilled in the art will recognize modifications to the embodiments described herein for specific applications. Such modifications including alteration of delay times and sequences are within the scope and spirit of the invention as defined in the following claims.

What is claimed is:

1. A method for simulating the appearance of film recorded images in a video signal comprising the steps of:
   receiving a composite video signal input;
   distributing the signal input as a first signal, a second signal, a third signal and a fourth signal;
   delaying the second signal for a first time period equivalent to the period of a first video field to produce a first delayed signal;
   delaying the third signal for a second time period equivalent to the period of a second video field to produce a second delayed signal;
   summing the first signal with the first delayed signal to produce an "A" field;
   summing the first signal with the second delayed signal;
   delaying the summed first signal and second delayed signal for a time period equivalent to the first time period to produce a "B" field;
   repetatively selecting between the A field and B field in a sequence of A-B-A-B-B-A-B-A-B-B to produce an internal signal;
   delaying the internal signal for a time period equivalent to the sum of the first and second time periods to produce an "A'" field;
   selecting between the internal signal and the "A'" field to repetatively produce a sequence of A-B-A-B-A' to produce a processed video signal;
   delaying the fourth signal for a time period equivalent to the circuit delay between the first signal and the processed video signal; and,
   selecting the processed video signal during the picture portion of the signal and the delayed fourth signal during the non-picture portion of the signal for a processed video output.

2. A method as defined in claim 1 further comprising the step of summing the first signal with clipped white noise for grain simulation.

3. A method as described in claim 1 further comprising the step of modifying the processed video signal through a non-linear amplifier to simulate the non-linear gray scale of film.

4. An apparatus for modifying a video signal to simulate the appearance of film recorded images comprising:
   means for receiving a composite video signal;
   a first delay means for receiving the composite video signal and providing an output signal with a first delay;
   a second delay means for receiving the composite video signal as an input and providing a signal output with a second delay;
   a first summing means for receiving the output signal of the first delay means and summing that signal with the composite video signal to produce an A field;
   second summing means for summing the output of the second delay means with the composite video signal;
   a third delay means receiving the summed composite video signal and second delayed signal and providing a signal output with a delay equal to the first delay as a B field;
   first switching means to selectably transmit the A field and B field;
   a fourth delay means connected to the first switch means providing a signal output with a delay equal to the sum of the first and second delay;
   a second switch means for selectably transmitting the signal transmitted by the first switch means and the output of the fourth delay means;
   a fifth delay means receiving the composite video signal and providing a signal output having a delay equal to the circuit delay of the signal transmitted through the second switch means;
   a third switch means selectably transmitting the signal transmitted by the second switch means and the signal output of the fifth delay means to provide a process video output; and
   control means for selecting the transmitted signals of the first, second and third switch means.

5. An apparatus as defined in claim 4 further comprising a third summing means located intermediate the input means and the first and second summing means for summing clipped white noise with the composite video signal.

6. An apparatus as defined in claim 4 further comprising a non-linear amplifier intermediate the second switch means and third switch means and wherein the fifth delay time includes the circuit delay of the non-linear amplifier.

7. An apparatus as defined in claim 4 wherein the control means is responsive to the composite video signal and comprises:
   a means for separating synchronization and start of field signals in the composite video signal;
   a first timing means responsive to the start of field signals which controls the third switch means to select the output of the fifth delay means for a first time period;
   a second timing means responsive to the synchronization signals for selecting the output of the fifth delay means by the third switch means for a second time period; and
   a counter means controlling selection of the first switch means by a first counted sequence and controlling the selection by the second switch means according to a second counted sequence, the counter means responsive to the first timing means for initialization.

8. An apparatus as defined in claim 7 wherein the first timing means comprises a one-shot circuit responsive to the start of field detected by the separation means, the output of the one shot comprising a signal of length equivalent to vertical blanking signal lines in the field, and wherein the second timing means comprises a second one-shot circuit responsive to the synchronization signal detected by the separation means, the second one shot providing a signal output of duration approximately equal to the period of time from synchronization to the unblanking portion of the composite video signal, and a third one-shot circuit responsive to the output of the second one-shot circuit and having an output of duration approximately equal to the duration of picture intelligence in the composite video signal.

9. An apparatus as defined in claim 6 wherein the first, second, third and fourth delay means are read/write digital video memories.

10. An apparatus as defined in claim 9 wherein the first and third delay means are even field duration read/write digital video memories, the second delay means is an odd field duration read/write digital video memory having a chrominance phase inversion circuit, and the fourth delay means is a one frame read/write digital video memory having a chrominance phase inversion circuit.

11. An apparatus as defined in claim 10 wherein the separation means further separates alternating field signals from the composite video signal and the apparatus further comprises a fourth switch means intermediate the counter means and the first switch means for selectably transmitting the first counting sequence from the counter and the alternating field signal detected by the separation means to the first switch means, and means for interrupting the second count sequence intermediate the counter means and the third switch means whereby the second switch means continuously selects the signal transmitted by the first switch means.

12. An apparatus as defined in claim 11 wherein the interruption means comprises an and gate receiving the second count sequence on a first input, a fifth switch means selectably transmitting a high signal and a low signal to a second input of the and gate, and the output of the AND gate controlling the second switch means.

* * * * *

UNITED STATES PATENT AND TRADEMARK OFFICE
CERTIFICATE OF CORRECTION

PATENT NO. : 4,935,816

DATED : June 19, 1990

INVENTOR(S) : Robert A. Faber

It is certified that error appears in the above-identified patent and that said Letters Patent is hereby corrected as shown below:

```
Column 1, line 46, change "comprise" to -- comprises --.
Column 7, line 60, change "two--two" to -- two-two --.
Column 7, line 68, change "51" to -- 510 --.
Column 12, lines 12,16, change "and" to -- AND --
         (both occurrences).
```

Signed and Sealed this

Fourteenth Day of January, 1992

Attest:

HARRY F. MANBECK, JR.

*Attesting Officer*  *Commissioner of Patents and Trademarks*